(12) United States Patent
Ishii

(10) Patent No.: US 12,540,822 B2
(45) Date of Patent: Feb. 3, 2026

(54) WATER AREA OBJECT DETECTION SYSTEM AND MARINE VESSEL

(71) Applicant: YAMAHA HATSUDOKI KABUSHIKI KAISHA, Iwata (JP)

(72) Inventor: Takahiro Ishii, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 331 days.

(21) Appl. No.: 18/092,966

(22) Filed: Jan. 4, 2023

(65) Prior Publication Data
US 2023/0228576 A1    Jul. 20, 2023

(30) Foreign Application Priority Data
Jan. 14, 2022    (JP) .................. 2022-004597

(51) Int. Cl.
  B63B 79/40    (2020.01)
  B63B 79/10    (2020.01)
  G01C 21/20    (2006.01)

(52) U.S. Cl.
  CPC ............ G01C 21/203 (2013.01); B63B 79/10 (2020.01); B63B 79/40 (2020.01)

(58) Field of Classification Search
  None
  See application file for complete search history.

(56) References Cited

U.S. PATENT DOCUMENTS

| | | |
|---|---|---|
| 2004/0105579 A1 | 6/2004 | Ishii et al. |
| 2020/0269962 A1 | 8/2020 | Gai et al. |
| 2020/0275036 A1 | 8/2020 | Kurokawa et al. |
| 2020/0298942 A1 | 9/2020 | Terada et al. |
| 2020/0329215 A1 | 10/2020 | Tsunashima |
| 2020/0393574 A1 | 12/2020 | Nakamura et al. |

(Continued)

FOREIGN PATENT DOCUMENTS

| | | |
|---|---|---|
| JP | 10-38561 A | 2/1998 |
| JP | 2002-359838 A | 12/2002 |

(Continued)

OTHER PUBLICATIONS

Extended European Search Report in EP22217173.8, mailed Jun. 15, 2023, 13 pages.

(Continued)

*Primary Examiner* — Adam D Tissot
*Assistant Examiner* — Laura E Linhardt
(74) *Attorney, Agent, or Firm* — Keating & Bennett, LLP

(57) ABSTRACT

A water area object detection system includes a first imager to image an object around a hull, a second imager provided on the hull such that an imaging direction of the second imager is the same or substantially the same as an imaging direction of the first imager and operable to image the object around the hull, and a controller configured or programmed to perform a control to create a water area map around the hull based on images captured by the first imager and the second imager. The second imager is spaced apart in an upward-downward direction of the hull from the first imager, and the first imager is spaced apart in the imaging direction from the second imager so as not to overlap the second imager in the upward-downward direction perpendicular to the imaging direction.

18 Claims, 7 Drawing Sheets

(56) References Cited

U.S. PATENT DOCUMENTS

| | | |
|---|---|---|
| 2021/0070407 A1 | 3/2021 | Ishii |
| 2021/0101664 A1 | 4/2021 | Nedwed et al. |
| 2022/0171987 A1* | 6/2022 | Kato ..................... G06V 20/10 |
| 2023/0144543 A1* | 5/2023 | Dake .................. G01C 21/3881 |
| | | 701/450 |
| 2023/0206596 A1* | 6/2023 | Yamamoto ........... G06V 20/625 |
| | | 382/103 |
| 2024/0304093 A1* | 9/2024 | Bernasconi ............. B63B 43/18 |

FOREIGN PATENT DOCUMENTS

| | | |
|---|---|---|
| JP | 2005-180949 A | 7/2005 |
| JP | 2006-113836 A | 4/2006 |
| JP | 2007-232389 A | 9/2007 |
| JP | 4214219 B2 | 1/2009 |
| JP | 2017-211366 A | 11/2017 |
| JP | 2020-027325 A | 2/2020 |
| JP | 6652253 B2 | 2/2020 |
| JP | 2020-132091 A | 8/2020 |
| JP | 2020-152180 A | 9/2020 |
| WO | 2017/212927 A1 | 12/2017 |
| WO | 2019/167517 A1 | 9/2019 |
| WO | 2019/230620 A1 | 12/2019 |

OTHER PUBLICATIONS

Singh et al., "Autonomous Cross-Country Navigation Using Stereo Vision," The Robotics Institute, Carnegie Mellon University, CMU-RI-TR-99-03, Jan. 1999, 76 pages.

* cited by examiner

WATER AREA OBJECT DETECTION SYSTEM AND MARINE VESSEL

CROSS REFERENCE TO RELATED APPLICATIONS

This application claims the benefit of priority to Japanese Patent Application No. 2022-004597 filed on Jan. 14, 2022. The entire contents of this application are hereby incorporated herein by reference.

BACKGROUND OF THE INVENTION

1. Field of the Invention

The present invention relates to a water area object detection system and a marine vessel, and more particularly, it relates to a water area object detection system and a marine vessel, each of which includes a plurality of imagers provided on a hull to image the surroundings of the hull.

2. Description of the Related Art

A water area object detection system and a marine vessel, each of which includes a plurality of imagers provided on a hull to image the surroundings of the hull, are known in general. Such a water area object detection system and a marine vessel are disclosed in Japanese Patent Laid-Open No. 2005-180949, for example.

Japanese Patent Laid-Open No. 2005-180949 discloses an automatic marine vessel docking system including a plurality of imagers to image the surroundings of a hull. The plurality of imagers of the automatic marine vessel docking system are provided side by side on the hull. The automatic marine vessel docking system images one imaging target such as a quay with the plurality of imagers to calculate a distance to the imaging target based on the principle of triangulation.

Although not clearly described in Japanese Patent Laid-Open No. 2005-180949, a technique is conventionally known to calculate a distance to a feature point included in an imaging target (an object around the hull) using two imagers to create a surrounding map of the hull. In the technique described above, it is known to reduce the load of image arithmetic processing using epipolar constraints, which are geometric constraints that all points located between one of the imagers and the feature point must be present on an epipolar line obtained by projecting a line connecting one of the imagers to the feature point onto an image captured by the other of the imagers, when the surrounding map of the hull is created. In addition, in the technique described above, it is known that when the image arithmetic process is performed using the epipolar constraints, a measurement error of a distance to the feature point becomes smaller as the angular dispersion of a plurality of acquired epipolar lines becomes larger (an angular difference becomes larger), but the measurement error of the distance to the feature point becomes greater as the angular dispersion of the plurality of epipolar lines becomes smaller (the angular difference becomes smaller) and the positional accuracy of the surrounding map decreases.

When such a technique is applied to the automatic marine vessel docking system described in Japanese Patent Laid-Open No. 2005-180949, the plurality of imagers are provided side by side on the hull, and thus many epipolar lines extending in a transverse direction in which the imagers are aligned are acquired. That is, the angular dispersion of the plurality of epipolar lines (the difference in the angles of the plurality of epipolar lines) is relatively small, and the positional accuracy of the surrounding map is low. Therefore, conventionally, it is desired to create a surrounding map with higher positional accuracy based on images captured by a plurality of imagers.

SUMMARY OF THE INVENTION

Preferred embodiments of the present invention provide water area object detection systems and marine vessels that each improve the positional accuracy of water area maps created based on images captured by a plurality of imagers.

A water area object detection system according to a preferred embodiment of the present invention includes a first imager provided on a hull to image an object around the hull, a second imager provided on the hull such that an imaging direction of the second imager is the same or substantially the same as an imaging direction of the first imager and operable to image the object around the hull, and a controller configured or programmed to perform a control to create a water area map around the hull based on images captured by the first imager and the second imager. The second imager is spaced apart in an upward-downward direction of the hull from the first imager, and the first imager is spaced apart in the imaging direction from the second imager so as not to overlap the second imager in the upward-downward direction perpendicular to the imaging direction.

A water area object detection system according to a preferred embodiment of the present invention includes the first imager and the second imager to image the object around the hull, the second imager is spaced apart in the upward-downward direction from the first imager, and the first imager is spaced apart in the imaging direction from the second imager so as not to overlap the second imager in the upward-downward direction perpendicular to the imaging direction. In a technique to create a water area map using two imagers with the same or substantially the same imaging direction, when the two imagers are spaced apart from each other in the imaging direction, the angular dispersion of a plurality of epipolar lines becomes larger (an angular difference becomes larger) as compared with a case in which the two imagers are spaced apart from each other only in a direction perpendicular to the imaging direction, such as a transverse direction or an upward-downward direction. Therefore, with the structure as described above, the first imager is spaced apart by a relatively large amount so as not to overlap the second imager in the upward-downward direction perpendicular to the imaging direction in order to increase the angular dispersion of a plurality of epipolar lines. Consequently, the positional accuracy of the water area map created based on the images captured by the first imager and the second imager is improved. Furthermore, the second imager is spaced apart in the upward-downward direction from the first imager such that an imaging range just in front of the second imager is prevented from being restricted by the first imager.

In a water area object detection system according to a preferred embodiment of the present invention, the first imager and the second imager are preferably operable to image a rear side of the hull, and the second imager is preferably spaced apart in an upward direction of the hull from the first imager, and is preferably spaced apart in a forward direction of the hull from the first imager. Accordingly, the first imager is located below the second imager in the imaging direction, and thus appearance of the first imager and a structure to install the first imager, for example, in the image captured by the second imager is reduced or prevented.

In such a case, the first imager and the second imager are preferably located at a stern of the hull and on a roof of the hull, respectively. Accordingly, using the existing stern and roof, the first imager and the second imager are easily provided such that the first imager is located below and behind the second imager in the imaging direction.

In a water area object detection system according to a preferred embodiment of the present invention, the second imager is preferably located such that the first imager fits within an imaging range of the second imager. Accordingly, the second imager is prevented from being located such that the first imager does not fit within the imaging range of the second imager. That is, the second imager is prevented from approaching an arrangement in which the second imager is aligned with the first imager in a transverse direction or the upward-downward direction perpendicular to the imaging direction. Therefore, the positional accuracy of the water area map created based on the images captured by the first imager and the second imager is further improved.

In such a case, the first imager preferably has an installation angle of about 50 degrees or less with respect to a horizontal plane and the second imager. Accordingly, the installation angle of the first imager with respect to the horizontal plane and the second imager is limited to about 50 degrees or less, and thus the second imager is prevented from approaching an arrangement in which the second imager is directly above the first imager due to an excessive increase in the installation angle. In other words, the second imager is prevented from approaching an arrangement in which the second imager is in a direction perpendicular to the imaging direction, such as the transverse direction or the upward-downward direction (directly above), from the first imager, and thus the angular dispersion of the plurality of epipolar lines is prevented from becoming small. Therefore, the positional accuracy of the water area map created based on the images captured by the first imager and the second imager is still further improved.

In a water area object detection system according to a preferred embodiment of the present invention, the controller is preferably configured or programmed to automatically dock the hull by automatically moving the hull toward a shore structure corresponding to the object imaged by the first imager and the second imager. Accordingly, the hull is easily docked at the shore structure.

In a water area object detection system according to a preferred embodiment of the present invention, the second imager is preferably located with respect to the first imager such that a target error of a distance to the object measured using the first imager and the second imager is about 10 cm or less when the distance to the object imaged by the first imager and the second imager is about 10 m or less. Accordingly, the target error of the distance to the object measured using the first imager and the second imager is small, and thus the positional accuracy of the water area map created based on the images captured by the first imager and the second imager is further improved.

In a water area object detection system according to a preferred embodiment of the present invention, the controller is preferably configured or programmed to create the water area map as a two-dimensional water area map to be extending in a horizontal direction perpendicular to the upward-downward direction in which the first imager and the second imager are spaced apart from each other. Accordingly, the processing load on the controller is reduced as compared with a case in which a three-dimensional water area map is created in consideration of the upward-downward direction (height direction).

In a water area object detection system according to a preferred embodiment of the present invention, a distance between the first imager and the second imager is preferably about 2.0 m or less. Accordingly, the first imager and the second imager are relatively close to each other, and thus the first imager and the second imager are easily installed in a relatively small marine vessel.

In a water area object detection system according to a preferred embodiment of the present invention, the controller is preferably configured or programmed to detect a feature point corresponding to the object in images based on the images captured by the first imager and the second imager to create the water area map in which an object presence range including a likelihood that the object is present is set around the feature point. Accordingly, the object presence range to be avoided by a marine vessel is shown in the water area map, and thus the object around the hull is easily known.

A water area object detection system according to a preferred embodiment of the present invention includes a first imager provided on a hull to capture an image around the hull, a second imager separate from the first imager, provided on the hull such that an imaging direction of the second imager is the same or substantially the same as an imaging direction of the first imager, and operable to capture an image around the hull, and a controller configured or programmed to perform a control to create a water area map around the hull based on the images captured by the first imager and the second imager. The second imager is spaced apart in an upward-downward direction of the hull from the first imager, and the first imager is spaced apart in the imaging direction from the second imager.

A water area object detection system according to a preferred embodiment of the present invention includes the first imager and the second imager to capture the images around the hull, the second imager is spaced apart in the upward-downward direction from the first imager, and the first imager is spaced apart in the imaging direction from the second imager. In a technique to create a water area map using two imagers with the same or substantially the same imaging direction, when the two imagers are spaced apart from each other in the imaging direction, the angular dispersion of a plurality of epipolar lines becomes larger (an angular difference becomes larger) as compared with a case in which the two imagers are spaced apart from each other only in a direction perpendicular to the imaging direction, such as a transverse direction or an upward-downward direction. Therefore, with the structure as described above, the first imager is spaced apart in the imaging direction from the second imager in order to increase the angular dispersion of a plurality of epipolar lines. Consequently, the positional accuracy of the water area map created based on the images captured by the first imager and the second imager is improved. Furthermore, the second imager is spaced apart in the upward-downward direction from the first imager such that an imaging range just in front of the second imager is prevented from being restricted by the first imager. Moreover, the first imager and the second imager are separate from each other, and thus their positions are freely adjusted.

A marine vessel according to a preferred embodiment of the present invention includes a hull and a water area object detection system provided on or in the hull. The water area object detection system includes a first imager provided on a hull to image an object around the hull, a second imager provided on the hull such that an imaging direction of the second imager is the same or substantially the same as an imaging direction of the first imager and operable to image the object around the hull, and a controller configured or programmed to perform a control to create a water area map around the hull based on images captured by the first imager and the second imager. The second imager is spaced apart in an upward-downward direction of the hull from the first imager, and the first imager is spaced apart in the imaging direction from the second imager so as not to overlap the second imager in the upward-downward direction perpendicular to the imaging direction.

A marine vessel according to a preferred embodiment of the present invention includes the first imager and the second imager to image the object around the hull, the second imager is spaced apart in the upward-downward direction from the first imager, and the first imager is spaced apart in the imaging direction from the second imager so as not to overlap the second imager in the upward-downward direction perpendicular to the imaging direction. In a technique to create a water area map using two imagers with the same or substantially the same imaging direction, when the two imagers are spaced apart from each other in the imaging direction, the angular dispersion of a plurality of epipolar lines becomes larger (an angular difference becomes larger) as compared with a case in which the two imagers are spaced apart from each other only in a direction perpendicular to the imaging direction, such as a transverse direction or an upward-downward direction. Therefore, with the structure as described above, the first imager is spaced apart by a relatively large amount so as not to overlap the second imager in the upward-downward direction perpendicular to the imaging direction in order to increase the angular dispersion of a plurality of epipolar lines. Consequently, the positional accuracy of the water area map created based on the images captured by the first imager and the second imager is improved. Furthermore, the second imager is spaced apart in the upward-downward direction from the first imager such that an imaging range just in front of the second imager is prevented from being restricted by the first imager.

In a marine vessel according to a preferred embodiment of the present invention, the hull preferably has an overall length of about 20 m or less. Accordingly, in the relatively small marine vessel, the positional accuracy of the water area map created based on the images captured by the first imager and the second imager is improved.

In a marine vessel according to a preferred embodiment of the present invention, the first imager and the second imager are preferably operable to image a rear side of the hull, and the second imager is preferably spaced apart in an upward direction of the hull from the first imager, and is preferably spaced apart in a forward direction of the hull from the first imager. Accordingly, the first imager is located below the second imager in the imaging direction, and thus appearance of the first imager and a structure to install the first imager, for example, in the image captured by the second imager is reduced or prevented.

In such a case, the first imager and the second imager are preferably located at a stern of the hull and on a roof of the hull, respectively. Accordingly, using the existing stern and roof, the first imager and the second imager are easily provided such that the first imager is located below and behind the second imager in the imaging direction.

In a marine vessel according to a preferred embodiment of the present invention, the second imager is preferably located such that the first imager fits within an imaging range of the second imager. Accordingly, the second imager is prevented from being located such that the first imager does not fit within the imaging range of the second imager. That is, the second imager is prevented from approaching an arrangement in which the second imager is aligned with the first imager in a transverse direction or the upward-downward direction perpendicular to the imaging direction. Therefore, the positional accuracy of the water area map created based on the images captured by the first imager and the second imager is further improved.

In such a case, the first imager preferably has an installation angle of about 50 degrees or less with respect to a horizontal plane and the second imager. Accordingly, the installation angle of the first imager with respect to the horizontal plane and the second imager is limited to about 50 degrees or less, and thus the second imager is prevented from approaching an arrangement in which the second imager is directly above the first imager due to an excessive increase in the installation angle. In other words, the second imager is prevented from approaching an arrangement in which the second imager is in a direction perpendicular to the imaging direction, such as the transverse direction or the upward-downward direction (directly above), from the first imager, and thus the angular dispersion of the plurality of epipolar lines is prevented from becoming small. Therefore, the positional accuracy of the water area map created based on the images captured by the first imager and the second imager is still further improved.

In a marine vessel according to a preferred embodiment of the present invention, the controller is preferably configured or programmed to automatically dock the hull by automatically moving the hull toward a shore structure corresponding to the object imaged by the first imager and the second imager. Accordingly, the hull is easily docked at the shore structure.

In a marine vessel according to a preferred embodiment of the present invention, the second imager is preferably located with respect to the first imager such that a target error of a distance to the object measured using the first imager and the second imager is about 10 cm or less when the distance to the object imaged by the first imager and the second imager is about 10 m or less. Accordingly, the target error of the distance to the object measured using the first imager and the second imager is small, and thus the positional accuracy of the water area map created based on the images captured by the first imager and the second imager is further improved.

In a marine vessel according to a preferred embodiment of the present invention, the controller is preferably configured or programmed to create the water area map as a two-dimensional water area map to be extending in a horizontal direction perpendicular to the upward-downward direction in which the first imager and the second imager are spaced apart from each other. Accordingly, the processing load on the controller is reduced as compared with a case in which a three-dimensional water area map is created in consideration of the upward-downward direction (height direction).

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
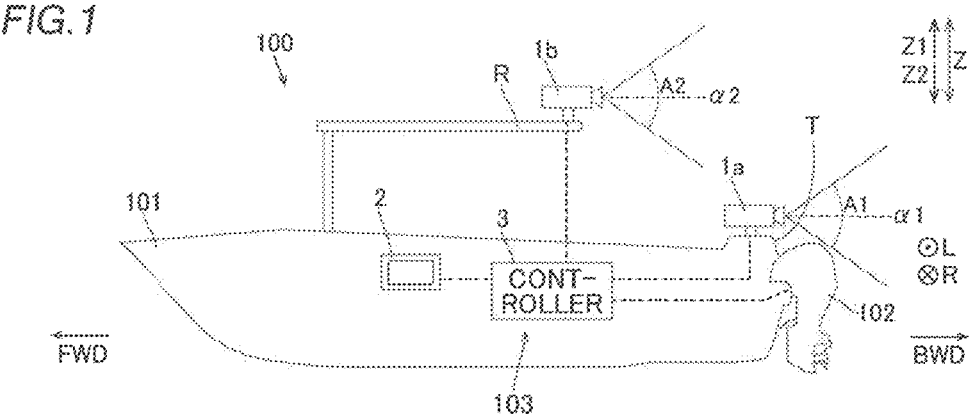
FIG. 1 is a side view showing a marine vessel including a water area object detection system according to a preferred embodiment of the present invention.

Preferred embodiments of the present invention are hereinafter described with reference to the drawings.

The structure of a marine vessel 100 including a water area object detection system 103 according to preferred embodiments of the present invention is now described with reference to FIGS. 1 to 9.

In the figures, arrow FWD represents the forward movement direction of the marine vessel 100 (front side with reference to a hull 101), and arrow BWD represents the reverse movement direction of the marine vessel 100 (rear side with reference to the hull 101). Arrow BWD also represents the imaging direction of a first imager 1a and a second imager 1b. A centerline α1 of an imaging range A1 of the first imager 1a and a centerline α2 of an imaging range A2 of the second imager 1b are parallel or substantially parallel to arrow BWD. Furthermore, the centerline α1 and the centerline α2 are parallel or substantially parallel to a centerline β (see FIG. 2) of the hull 101 in a right-left direction.

In the figures, arrow L represents the portside direction of the marine vessel 100 (left side with respect to the hull 101), and arrow R represents the starboard direction of the marine vessel 100 (right side with respect to the hull 101).

In the figures, a Z direction indicates an upward-downward direction. A Z1 direction indicates an upward direction. A Z2 direction indicates a downward direction.

As shown in FIG. 1, the marine vessel 100 includes the hull 101, a marine propulsion device 102 provided on the hull 101, and the water area object detection system 103 provided on or in the hull 101. The water area object detection system 103 includes the first imager 1a and the second imager 1b.

The marine propulsion device 102 is attached to a stern (transom) T of the hull 101 from behind. That is, in a preferred embodiment of the present invention, the marine propulsion device 102 is an outboard motor, and the marine vessel 100 is an outboard motor boat.

Figure 2:
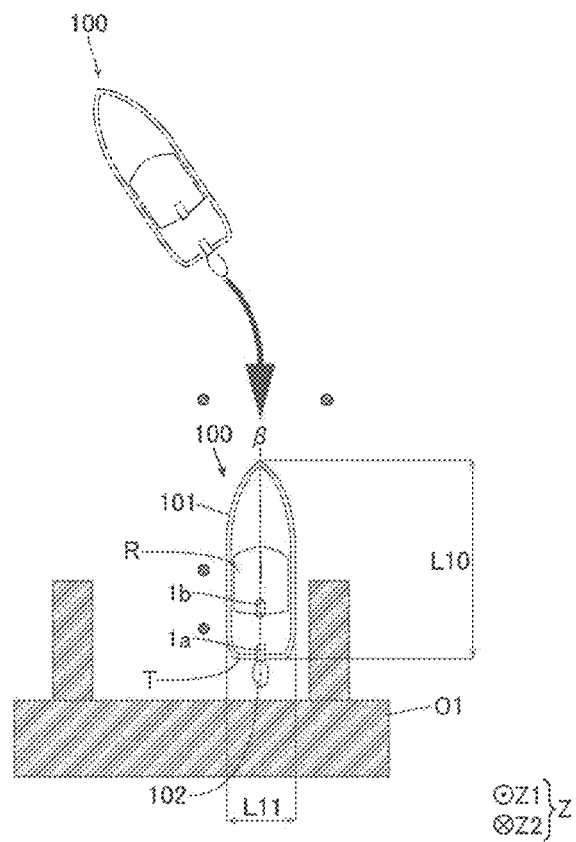
FIG. 2 is a plan view illustrating docking of a marine vessel at a shore structure according to a preferred embodiment of the present invention.

The overall length (length in a forward-rearward direction) L10 of the hull 101 shown in FIG. 2 is about 20 m (about 65 feet) or less, which is relatively small. As an example, the hull 101 is a hull of a small marine vessel with an overall length L10 of about 8.7 m (about 28 feet), and is docked with a shore structure O1 positioned not to the left of the hull 101 but to the rear of the hull 101. As an example, the width L11 of the hull 101 is about 2.5 m.

The water area object detection system 103 (controller 3) shown in FIG. 1 performs a control to estimate the self-position of the hull 101 in a water area map M while creating the two-dimensional water area map M (see FIG. 3) around the hull 101 that extends in a horizontal direction. The two-dimensional water area map M extends in the horizontal direction perpendicular to the upward-downward direction (Z direction) in which the first imager 1a and the second imager 1b are spaced apart or deviated from each other.

As an example, the control described above (the control to estimate the self-position of the hull 101 in the water area map M while creating the water area map M) is achieved by simultaneous localization and mapping (SLAM).

The SLAM is a technique to simultaneously create an environment map around a mobile device and estimate the self-position of the mobile device in the environment map using an image captured by a camera installed on the mobile device, for example. Unlike estimation of a self-position on a map using a global positioning system (GPS), for example, estimation of the self-position of the mobile device using the SLAM is able to be performed even in an environment such as indoors in which a GPS or the like is not usable.

The SLAM enables the mobile device to move while avoiding surrounding objects so as to not collide with the objects, and to move along an optimal movement route without duplication of routes, for example.

The SLAM includes passive SLAM (such as so-called visual SLAM) that uses an image sensor such as a camera to image a surrounding object, and active SLAM (such as so-called LiDAR SLAM) performed by irradiating a surrounding object with a laser beam of a laser device and detecting the reflected laser beam. The water area object detection system 103 according to a preferred embodiment of the present invention performs a control using a technique such as the former passive SLAM.

Figure 3:
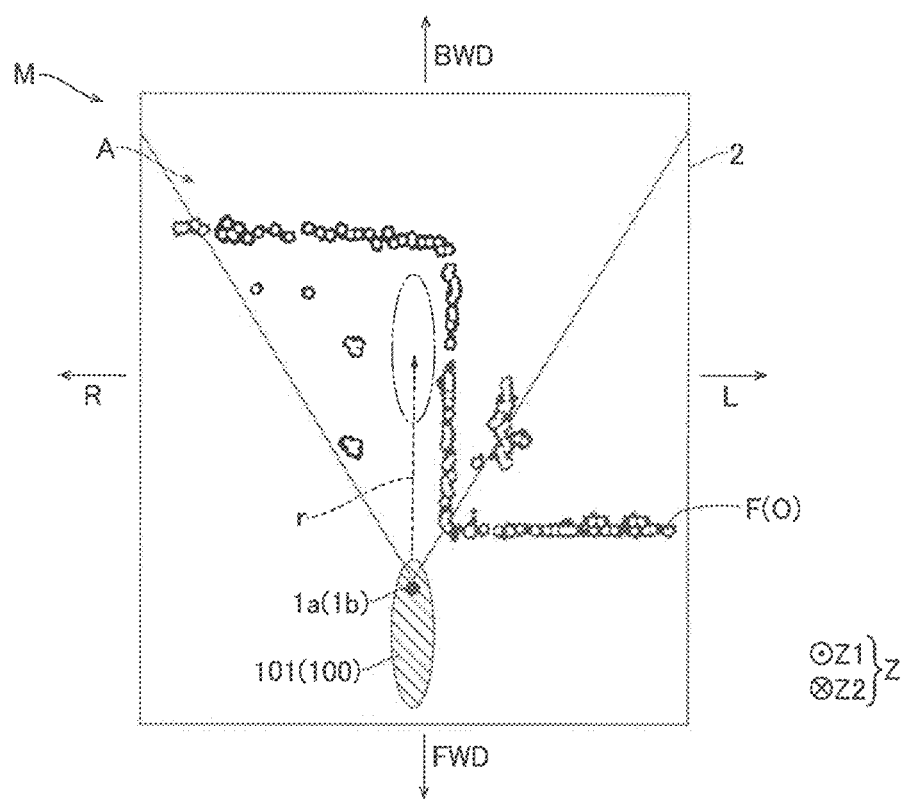
FIG. 3 is a diagram showing a water area map created by a water area object detection system according to a preferred embodiment of the present invention.
Figure 4:
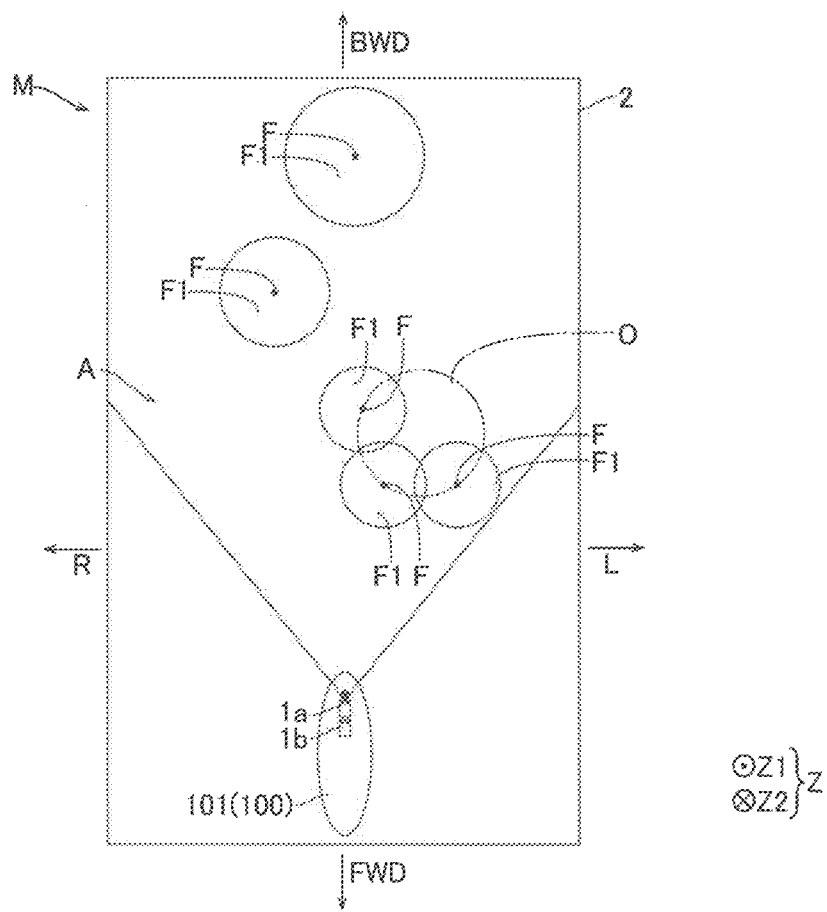
FIG. 4 is a schematic view illustrating the sizes of object presence ranges on a water area map created by a water area object detection system according to a preferred embodiment of the present invention.

As shown in FIGS. 3 and 4, the marine vessel 100 performs a control to automatically move while avoiding obstacles (objects O) along a movement route r and a control to automatically dock the hull 101 at the shore structure O1 (see FIG. 2) such as a floating pier using the water area map M created using the water area object detection system 103.

The marine vessel 100 uses the water area map M as a way to know the positions of the obstacles (objects O) not only when the marine vessel 100 automatically moves but also when a user manually maneuvers the marine vessel 100. That is, the water area map M is a so-called cost map to indicate the positions of the obstacles (objects O) that are present around the marine vessel 100, for example.

As shown in FIG. 1, the water area object detection system 103 includes the first imager 1a, the second imager 1b, a display 2, and a controller 3. The first imager 1a, the second imager 1b, the display 2, and the controller 3 are provided on or in the hull 101.

As shown in FIG. 4, the water area object detection system 103 (controller 3) performs a control to create the water area map M in which an object presence range F1 including a likelihood that an object O is present is set around a feature point F by detecting, based on images captured by the first imager 1a and the second imager 1b, the feature point F corresponding to the object O in the images together with a distance to the feature point F.

The first imager 1a and the second imager 1b shown in FIG. 1 capture images around the hull 101. The first imager 1a and the second imager 1b include monocular cameras including the same structure. That is, the second imager 1b is separate from the first imager 1a. The first imager 1a and the second imager 1b each include an imaging device such as a CCD sensor or a CMOS sensor. The first imager 1a and the second imager 1b are provided on the centerline 3 (see FIG. 2) of the hull 101 in the right-left direction in a plan view.

The first imager 1a is provided at the stern (transom) T of the hull 101. The second imager 1b is provided on a roof R of the hull 101.

The second imager 1b is provided on the hull 101 such that the imaging direction thereof is the same or substantially the same as the imaging direction of the first imager 1a. Specifically, the first imager 1a and the second imager 1b image the rear (BWD) side of the hull 101 as the imaging direction.

The second imager 1b is spaced apart in the upward-downward direction from the first imager 1a, and the first imager 1a is spaced apart in the imaging direction from the second imager 1b so as not to overlap the second imager 1b in the upward-downward direction perpendicular to the imaging direction. Specifically, the second imager 1b is spaced apart in the upward direction from the first imager 1a, and is spaced apart in a forward direction from the first imager 1a. The rear end (the end on the first imager 1a side) of the second imager 1b is located forward of the front end (the end on the second imager 1b side) of the first imager 1a. Thus, the second imager 1b is spaced apart in the upward direction from the first imager 1a such that a range just in front of the second imager 1b in the imaging range A2 (a central portion of the image) of the second imager 1b is not restricted by the first imager 1a.

The second imager 1b is located such that the first imager 1a fits within the imaging range A2 of the second imager 1b. That is, the second imager 1b is located such that the first imager 1a appears on the lower side of the image captured by the second imager 1b.

The installation angle θ (see FIG. 5) of the first imager 1a with respect to a horizontal plane and the second imager 1b is about 50 degrees or less. As an example, the installation angle θ of the first imager 1a with respect to the horizontal plane and the second imager 1b is about 30 degrees. It is known from the viewpoint of epipolar constraints, which are geometric constraints, that as the installation angle θ decreases, the angular dispersion of a plurality of acquired epipolar lines becomes larger, a measurement error of the distance to the feature point becomes smaller, and the positional accuracy of the water area map increases.

Figure 5:
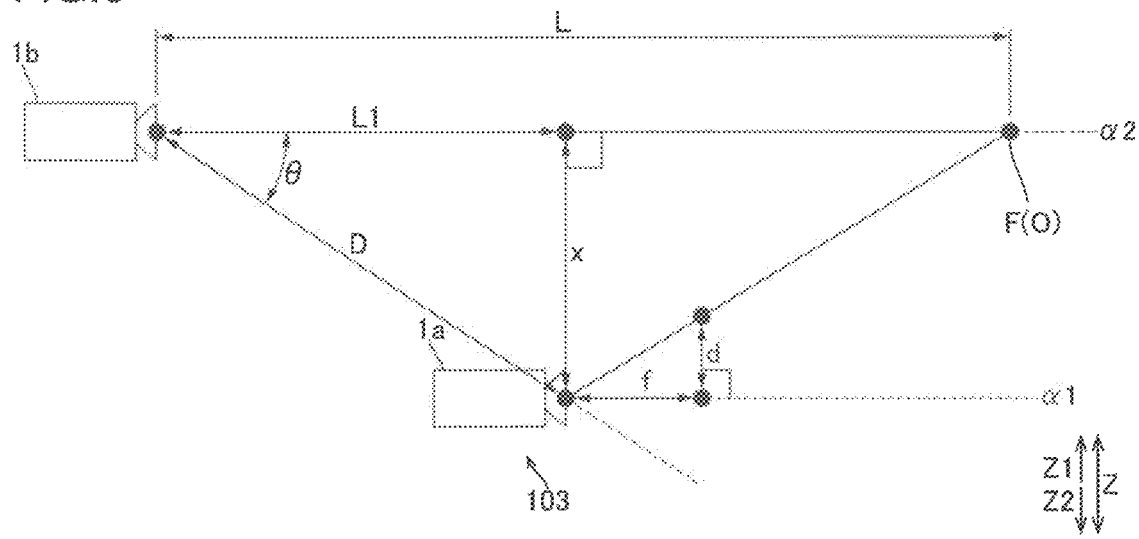
FIG. 5 is a diagram illustrating triangulation using a first imager and a second imager of a water area object detection system according to a preferred embodiment of the present invention.
Figure 6:
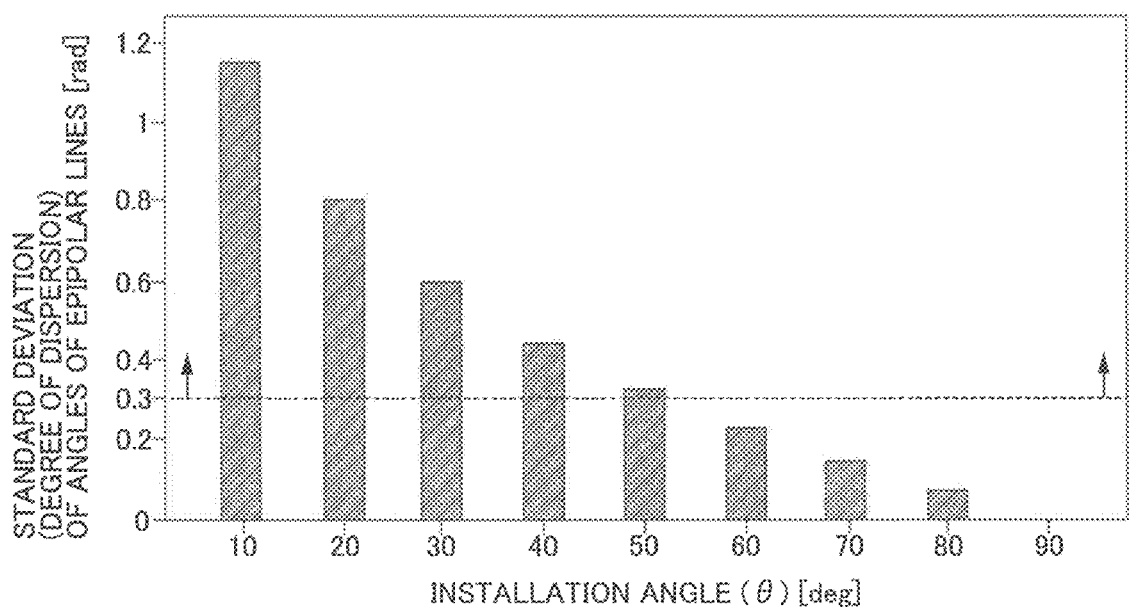
FIG. 6 is a graph showing a relationship between the installation angle (θ) of a first imager with respect to a horizontal plane and a second imager and the standard deviation of the angles of epipolar lines.

As an example, FIG. 6 shows the results of calculating the standard deviation [rad] of the angles of a plurality of epipolar lines by fixing a distance in the horizontal direction between the first imager 1a and the second imager 1b shown in FIG. 5 at L1 and acquiring a plurality of epipolar lines for each of imager arrangements in which the installation angle θ of the first imager 1a with respect to the horizontal plane and the second imager 1b is changed at intervals of 10 degrees up to 90 degrees. As the installation angle θ decreases, the standard deviation of the angles of the epipolar lines decreases. In the Example, the standard deviation is larger than about 0.3 when the installation angle θ is about 50 degrees or less. Cases in which the installation angle θ shown in FIG. 6 is 60 to 90 degrees are Comparative Examples.

A distance D between the first imager 1a and the second imager 1b is about 2.0 m or less. As an example, the distance D between the first imager 1a and the second imager 1b is about 1.5 m. A range in which the distance D is about 2.0 m or less takes into consideration a structure in which the overall length L10 (see FIG. 2) of the hull 101 is about 20 m (about 65 feet) or less.

Figure 7:
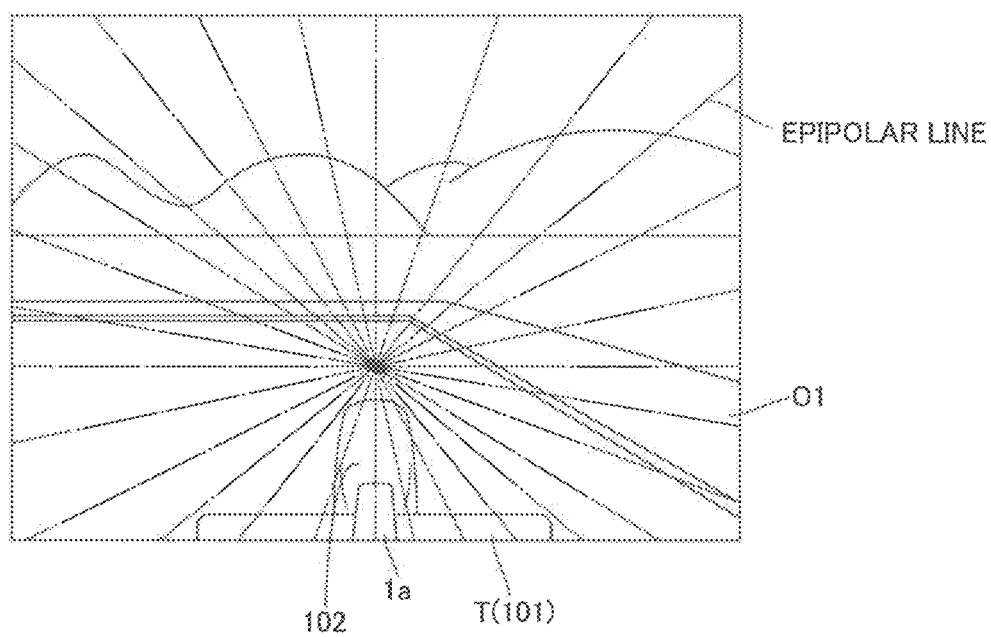
FIG. 7 is a diagram illustrating an Example in which epipolar lines are shown in an image captured by a second imager when a first imager and the second imager are spaced apart in an imaging direction.
Figure 8:
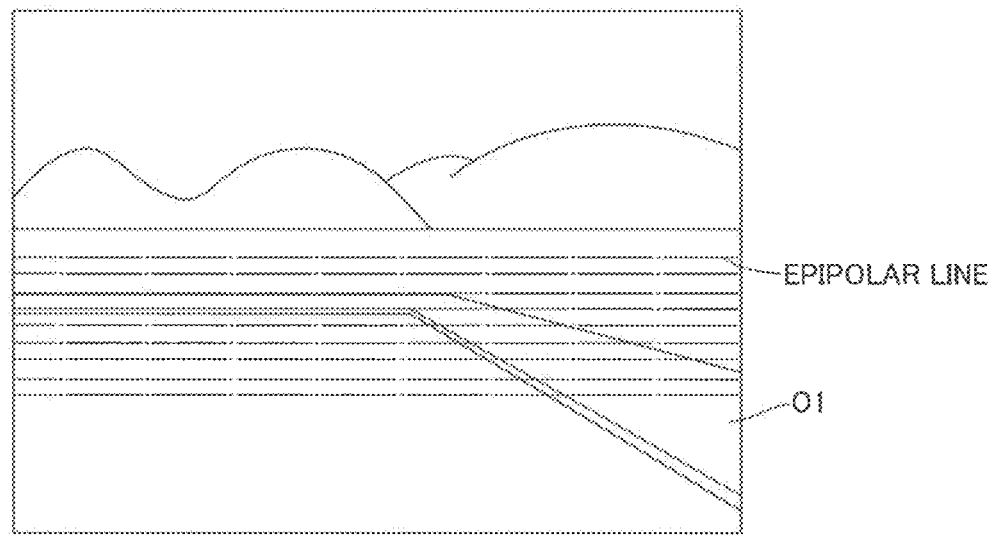
FIG. 8 is a diagram illustrating a Comparative Example in which epipolar lines are shown in an image captured by a second imager when a first imager and the second imager are located side by side.
Figure 9:
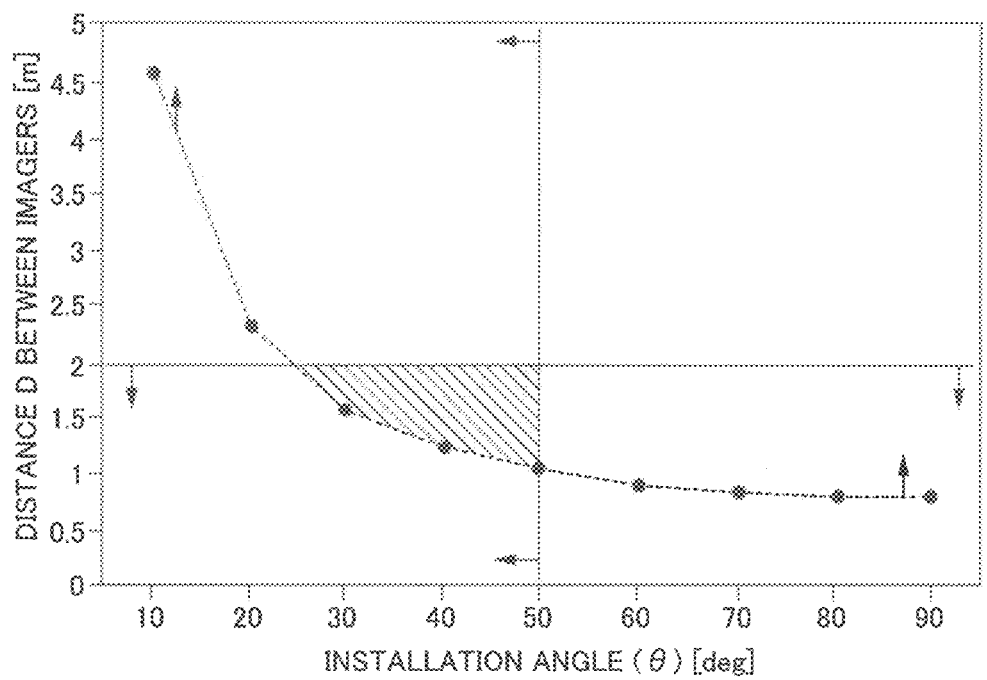
FIG. 9 is a graph showing a relationship between the installation angle (θ) of a first imager with respect to a horizontal plane and a second imager and a distance (D) between the first imager and the second imager.

FIG. 7 shows an Example of a preferred embodiment of the present invention showing the epipolar lines in the image captured by the second imager 1b in a case in which the distance D between the first imager 1a and the second imager 1b is about 1.5 m, and the installation angle θ of the first imager 1a with respect to the horizontal plane and the second imager 1b is about 30 degrees. FIG. 8 shows a Comparative Example showing the epipolar lines in the image captured by the second imager in a case in which the first imager and the second imager are provided side by side in the right-left direction. The plurality of epipolar lines extend radially in the image of FIG. 7. The plurality of epipolar lines extend in the right-left direction in the image of FIG. 8.

The water area object detection system 103 (controller 3) measures the distance to the feature point F using the first imager 1a and the second imager 1b. Specifically, the water area object detection system 103 (controller 3) measures the distance to the feature point F corresponding to the object O in an image captured by triangulation based on the images captured by the first imager 1a and the second imager 1b.

The "feature point F corresponding to the object O in an image" refers to a specific point shown in a portion of the image in which the object O is located. As an example, the feature point F is set in a portion of the image in which there is a particularly large change in brightness or color tone.

The water area object detection system 103 (controller 3) preliminarily performs distortion correction of the images captured by the first imager 1a and the second imager 1b, rectification to associate the images with each other, parallax estimation by matching corresponding feature points F on the images, and estimation of a relative position/relative orientation between the first imager 1a and the second imager 1b, for example, as preprocessing for distance measurement by the triangulation.

Measurement of the distance to the feature point F by the triangulation performed by the water area object detection system 103 (controller 3) is now described with reference to FIG. 5.

Assuming that L1 represents the distance in a horizontal direction (imaging direction) between the first imager 1a and the second imager 1b as described above, x represents a distance in the upward-downward direction between the first imager 1a and the second imager 1b, d represents the parallax of the first imager 1a and the second imager 1b, p represents the element pitch of the imaging device of the first imager 1a (second imager 1b), and f represents a focal length of the first imager 1a (second imager 1b), a distance L in the horizontal direction from the second imager 1b to the feature point F (object O) is obtained by the following formula (1). The parallax d is a difference between the coordinates on the images of corresponding feature points of the images captured by the first imager 1a and the second imager 1b, and the unit is pixels.

Mathematical Formula 1

$$L = \frac{fx}{pd} + L1 \qquad (1)$$

The second imager 1b is located with respect to the first imager 1a such that a target error δ of a distance to the object O measured using the first imager 1a and the second imager 1b is 10 cm or less when the distance L to the object O imaged by the first imager 1a and the second imager 1b is 10 m or less. The target error δ is an estimated distance resolution determined by the resolution of the parallax d near the distance L=10 m. Assuming that the unit of the resolution of the parallax d is 1 pixel, and da and db represent the parallaxes of two imagers (da=10 pixels and db=11 pixels, for example), the resolution of the distance L, i.e., the target error δ (the unit is [m]) is obtained by the following formula (2).

Mathematical Formula 2

$$\delta = L_a - L_b = \left(\frac{fx}{pd_a} - L_1\right) - \left(\frac{fx}{pd_b} - L_1\right) \qquad (2)$$

Considering the relationship between the linear distance D between the first imager 1a and the second imager 1b and the installation angle θ of the first imager 1a with respect to the horizontal plane and the second imager 1b so as to satisfy the error conditions described above, an area above a broken line shown in FIG. 9 satisfies the error conditions described above. In an area below the broken line, the target error δ is greater than 10 cm.

When the installation angle θ is set to about 50 degrees or less and the distance D is set to about 2.0 m or less under the error conditions described above, a hatched area in FIG. 9 satisfies the error conditions described above.

As shown in FIGS. 3 and 4, the display 2 (see FIG. 1) displays the water area map M created by the controller 3 (see FIG. 1). As an example, the display 2 displays the water area map M within a display image of 450 pixels wide by 600 pixels long. The display image of 450 pixels wide by 600 pixels long is a display image in which a point group is plotted in a world coordinate system. As an example, the size of one pixel of the water area map M corresponds to a size of about 10 cm horizontally and about 10 cm vertically in the world coordinate system.

The display 2 displays the hull 101 on the water area map M. The display 2 displays a schematic model of the hull 101 on the water area map M.

The display 2 displays the feature points F on the water area map M. Furthermore, the display 2 displays, on the water area map M, the object presence range F1 set around the feature point F and including a likelihood that the object O is present. As a specific example, the controller 3 performs a control to display one feature point F in one pixel of the display 2 and set a perfect circular object presence range F1 around one pixel P in which the feature point F is displayed to display the feature point F and the perfect circular object presence range F1 on the display 2. The object presence range F1 has a circular shape with a smaller radius as it is closer to the hull 101.

The object presence range F1 refers to a range set around the feature point F and including a likelihood that the object O is present. In short, the object presence range F1 refers to a range in which the object O is probabilistically present. In other words, the object presence range F1 should be avoided when the marine vessel 100 moves, and a movement route for movement of the marine vessel 100 is not in the object presence range F1.

The display 2 displays an imaging area A with a predetermined angle of view indicating a range currently being imaged by the first imager 1a and the second imager 1b on the water area map M.

The controller 3 shown in FIG. 1 includes a circuit board including a central processing unit (CPU), a read-only memory (ROM), a random access memory (RAM), etc., for example. The controller 3 is connected to the first imager 1a, the second imager 1b, the display 2, and the marine propulsion device 102 by signal lines.

The controller 3 performs a control to automatically move the hull 101 by setting the movement route r for automatic movement based on the created water area map M (see FIG. 3) and controlling driving of the marine propulsion device 102.

The controller 3 performs a control to create the water area map M in which the perfect circular object presence range F1 including a likelihood that the object O is present is set around the feature point F by detecting the feature point F corresponding to the object O in the images together with the distance to the feature point F based on the images captured by the first imager 1a and the second imager 1b.

The controller 3 creates the two-dimensional water area map M extending in the horizontal direction around the hull 101 by setting the object presence range F1 in the horizontal plane perpendicular to the upward-downward direction (Z direction) in which the first imager 1a and the second imager 1b are spaced apart from each other.

Examples and Comparative Examples regarding the correlation between the angular dispersion of the epipolar lines and errors in the captured images are now described with reference to FIGS. 10 to 14.

Figure 10:
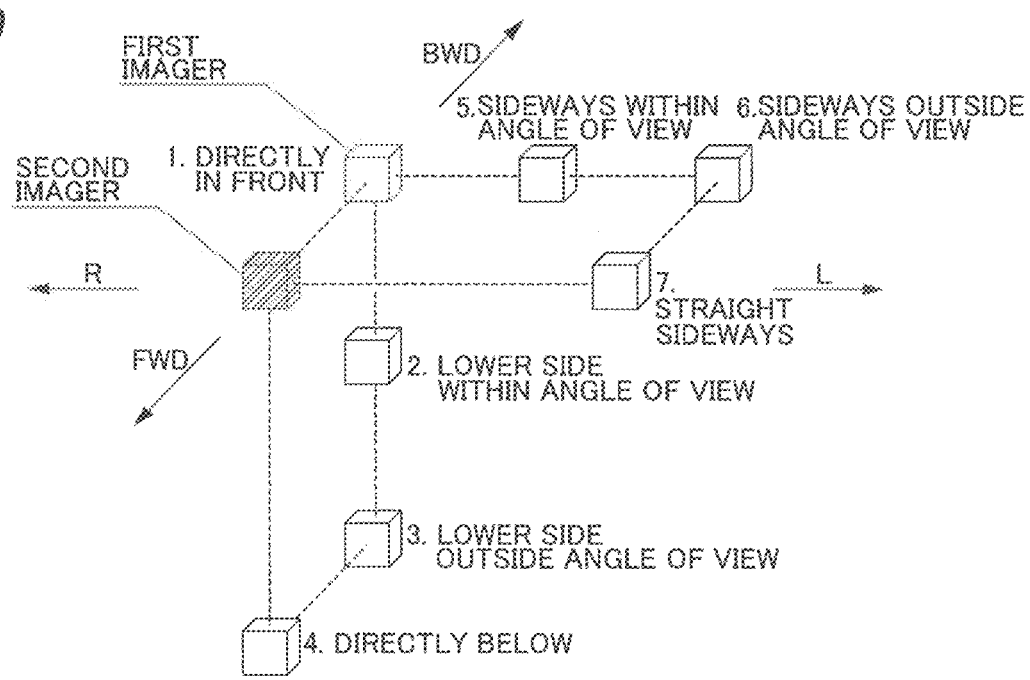
FIG. 10 is a diagram illustrating arrangements of a first imager with respect to a second imager in Examples 2 and 3 and Comparative Examples 1 and 4 to 7.

As shown in FIG. 10, images were captured by changing the position of the first imager to positions 1 to 7 with respect to the fixed position of the second imager. The imaging direction of the first imager and the second imager are along arrow BWD. The positions 2 and 3 of the first imager are Examples, and the others (positions 1 and 4 to 7) are Comparative Examples.

At the position 1, the first imager is located directly in front of the second imager. At the position 2, the first imager is located on the lower rear side within the angle of view of the second imager. At the position 3, the first imager is located on the lower rear side outside the angle of view of the second imager. At the position 4, the first imager is located directly below the second imager. At the position 5, the first imager is located on the rear left side within the angle of view of the second imager. At the position 6, the first imager is located on the rear left side outside the angle of view of the second imager. At the position 7, the first imager is located directly to the left within the angle of view of the second imager.

Figure 11:
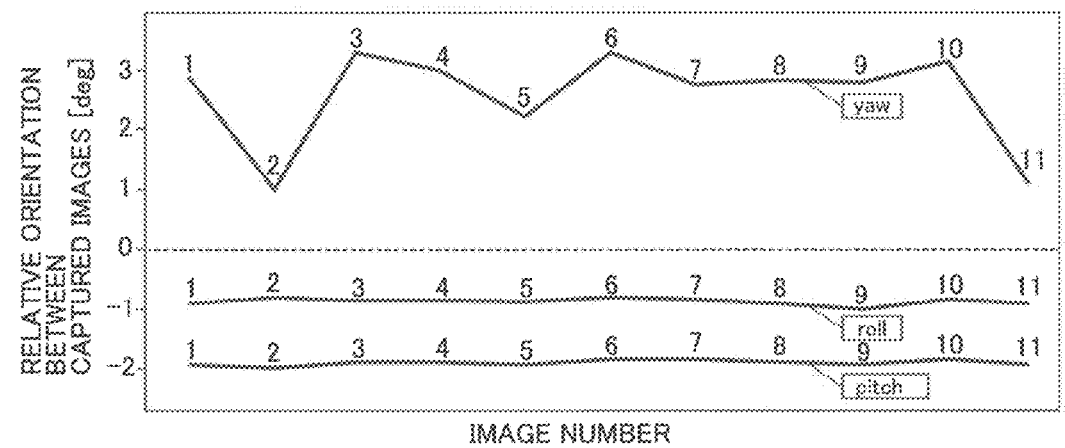
FIG. 11 is a graph showing changes in a relative orientation between captured images when a plurality of images are captured with a first imager and a second imager located at a predetermined position.

Then, for each of the positions 1 to 7 of the first imager, a predetermined number of images (eleven, for example) were captured, and a relative orientation [deg] including a pitch angle, a yaw angle, and a roll angle between the first imager and the second imager was estimated from the captured images. As an example, FIG. 11 shows the variation of the relative orientation between the captured images at the position 7 of the first imager. Image numbers in FIG. 11 indicate the number of images captured in order. In FIG. 11, it can be seen that the yaw varies greatly between the images, and an error of the relative orientation in the captured images (as error of the relative orientation between the first imager and the second imager) is large. In FIG. 11, it is ideal that all of the pitch, yaw, and roll extend in a straight line in the lateral direction, because the error of the relative orientation in the images becomes small.

Figure 12:
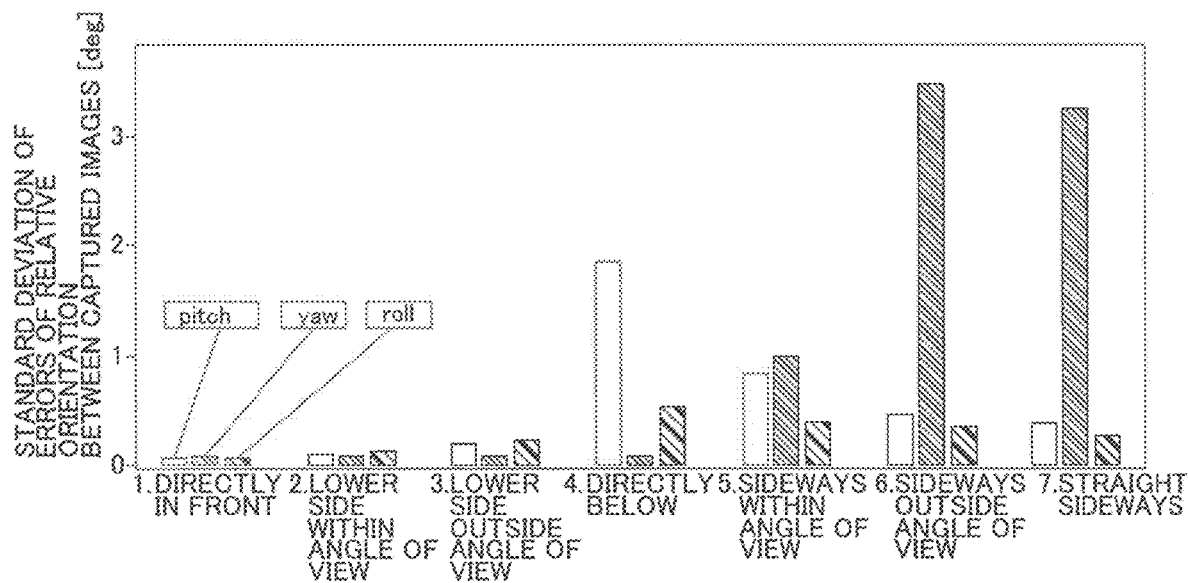
FIG. 12 is a graph showing a relationship between arrangements of a first imager with respect to a second imager and the standard variation of errors of a relative orientation between captured images.

FIG. 12 shows the standard deviations [deg] of errors of the relative orientation for the pitch, yaw, and roll at each of the positions 1 to 7 of the first imager. It can be seen that the standard deviations [deg] of the errors of the relative orientation for all the pitch, yaw, and roll are small at the positions 1 to 3 of the first imager. On the other hand, it can be seen that the standard deviation [deg] of the errors of the relative orientation for any of the pitch, yaw, and roll is large at the positions 4 to 7 of the first imager.

Figure 13:
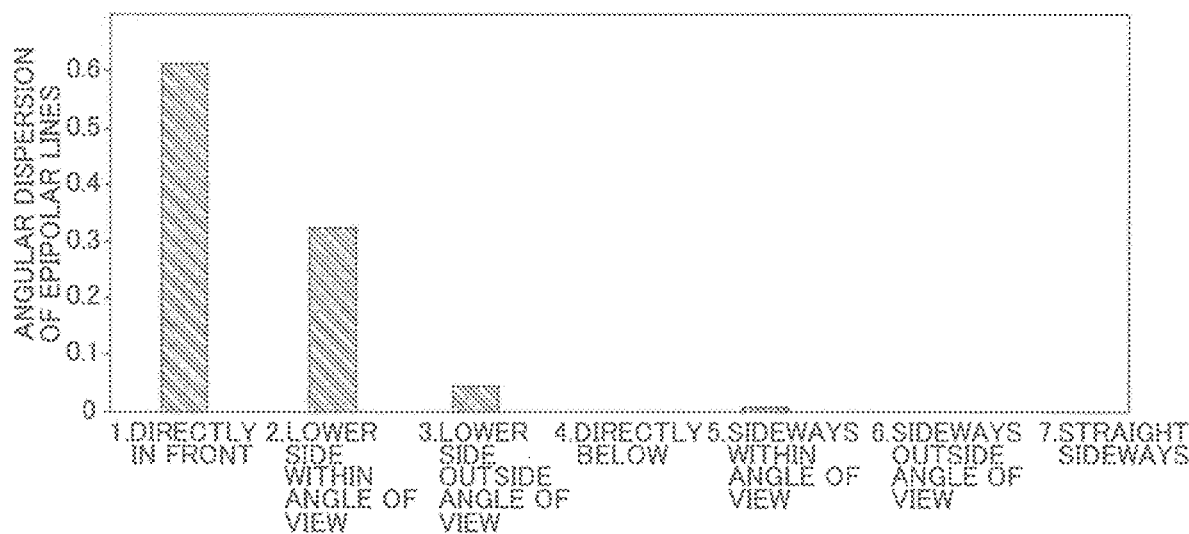
FIG. 13 is a graph showing a relationship between arrangements of a first imager with respect to a second imager and the angular dispersion of epipolar lines.

FIG. 13 shows the results of measuring the angular dispersion of the epipolar lines when a predetermined number of feature points are specified and a plurality of epipolar lines are acquired at each of the positions 1 to 7 of the first imager. At the positions 4 and 7 of the first imager, the plurality of epipolar lines become parallel or substantially parallel lines extending vertically or horizontally on the image, and thus the dispersion becomes zero.

At the positions 5 and 6 of the first imager, a direction in which the first imager and the second imager are aligned coincides with a direction in which an object to be imaged (an object for which feature points are to be acquired) extends, and thus the plurality of epipolar lines extend horizontally on the image, and the dispersion becomes small. The direction in which the object to be imaged (the object for which feature points are to be acquired) extends refers to a horizontal direction in which a shore structure such as a pier extends. At the positions 1 to 3 of the first imager, the position of the first imager is shifted from the position of the second imager in the imaging direction, and thus the dispersion becomes large.

Figure 14:
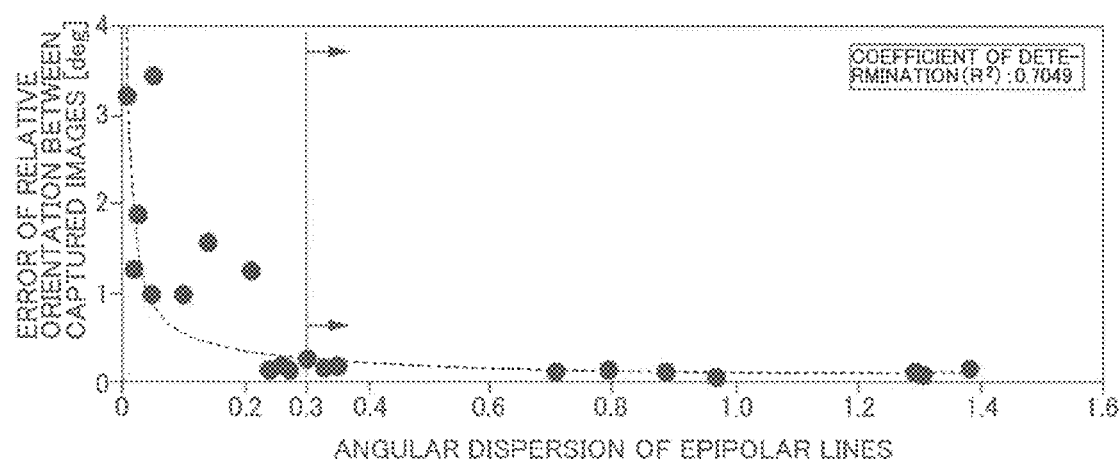
FIG. 14 is a graph showing a relationship between the angular dispersion of epipolar lines and errors of a relative orientation between captured images.

FIG. 14 shows the correlation between the error of the relative orientation between the captured images and the angular dispersion of the epipolar lines, together with a dashed power approximation curve. The coefficient of determination ($R^2$) of the power approximation curve is about 0.7049. In a range in which the dispersion is about 0.3 or more, measurement points are generally located on the power approximation curve. Therefore, when the dispersion is at least about 0.3 or more, the error of the relative orientation between the first imager and the second imager is maintained sufficiently small.

According to the various preferred embodiments of the present invention described above, the following advantageous effects are achieved.

According to a preferred embodiment of the present invention, the water area object detection system 103 includes the first imager 1a and the second imager 1b to image the object O around the hull 101, the second imager 1b is spaced apart in the upward-downward direction from the first imager 1a, and the first imager 1a is spaced apart in the imaging direction from the second imager 1b so as not to overlap the second imager 1b in the upward-downward direction perpendicular to the imaging direction. In a technique to create a water area map using two imagers with the same or substantially the same imaging direction, when the two imagers are spaced apart from each other in the imaging direction, the angular dispersion of a plurality of epipolar lines becomes larger (an angular difference becomes larger) as compared with a case in which the two imagers are spaced apart from each other only in a direction perpendicular to the imaging direction, such as a transverse direction or an upward-downward direction. Therefore, with the structure as described above, the first imager 1b is spaced apart by a relatively large amount so as not to overlap the second imager 1b in the upward-downward direction perpendicular to the imaging direction in order to increase the angular dispersion of the plurality of epipolar lines. Consequently, the positional accuracy of the water area map M created based on the images captured by the first imager 1a and the second imager 1b is improved. Furthermore, the second imager 1b is spaced apart in the upward-downward direction from the first imager 1a such that the imaging range just in front of the second imager 1b is prevented from being restricted by the first imager 1a. Moreover, the first imager 1a and the second imager 1b are separate from each other, and thus their positions are freely adjusted.

According to a preferred embodiment of the present invention, the first imager 1a and the second imager 1b are operable to image the rear side of the hull 101 as the imaging direction, and the second imager 1b is spaced apart in the upward direction from the first imager 1a, and is spaced apart in the forward direction from the first imager 1a. Accordingly, the first imager 1a is located below the second imager 1b in the imaging direction, and thus appearance of the first imager 1a and a structure to install the first imager 1a, for example, in the image captured by the second imager 1b is reduced or prevented.

According to a preferred embodiment of the present invention, the first imager 1a and the second imager 1b are located at the stern T of the hull 101 and on the roof R of the hull 101, respectively. Accordingly, using the existing stern T and roof R, the first imager 1a and the second imager 1b are easily provided such that the first imager 1a is located below and behind the second imager 1b in the imaging direction.

According to a preferred embodiment of the present invention, the second imager 1b is located such that the first imager 1a fits within the imaging range of the second imager 1b. Accordingly, the second imager 1b is prevented from being located such that the first imager 1a does not fit within the imaging range of the second imager 1b. That is, the second imager 1b is prevented from approaching an arrangement in which the second imager 1b is aligned with the first imager 1a in a transverse direction or the upward-downward direction perpendicular to the imaging direction. Therefore, the positional accuracy of the water area map M created based on the images captured by the first imager 1a and the second imager 1b is further improved.

According to a preferred embodiment of the present invention, the installation angle of the first imager 1a with respect to the horizontal plane and the second imager 1b is about 50 degrees or less. Accordingly, the installation angle of the first imager 1a with respect to the horizontal plane and the second imager 1b is limited to about 50 degrees or less, and thus the second imager 1b is prevented from approaching an arrangement in which the second imager 1b is directly above the first imager 1a due to an excessive increase in the installation angle. In other words, the second imager 1b is prevented from approaching an arrangement in which the second imager 1b is in a direction perpendicular to the imaging direction, such as the transverse direction or the upward-downward direction (directly above), from the first imager 1a, and thus the angular dispersion of the plurality of epipolar lines is prevented from becoming small. Therefore, the positional accuracy of the water area map M created based on the images captured by the first imager 1a and the second imager 1b is still further improved.

According to a preferred embodiment of the present invention, the controller 3 is configured or programmed to automatically dock the hull 101 by automatically moving the hull 101 toward the shore structure O1 corresponding to the object O imaged by the first imager 1a and the second imager 1b. Accordingly, the hull 101 is easily docked at the shore structure O1.

According to a preferred embodiment of the present invention, the second imager 1b is located with respect to the first imager 1a such that the target error of the distance to the object O measured using the first imager 1a and the second imager 1b is about 10 cm or less when the distance to the object O imaged by the first imager 1a and the second imager 1b is about 10 m or less. Accordingly, the target error of the distance to the object O measured using the first imager 1a and the second imager 1b is small, and thus the positional accuracy of the water area map created based on the images captured by the first imager 1a and the second imager 1b is further improved.

According to a preferred embodiment of the present invention, the controller 3 is configured or programmed to create the two-dimensional water area map M extending in the horizontal direction perpendicular to the upward-downward direction in which the first imager 1a and the second imager 1b are spaced apart from each other. Accordingly, the processing load on the controller 3 is reduced as compared with a case in which a three-dimensional water area map M is created in consideration of the upward-downward direction (height direction).

According to a preferred embodiment of the present invention, the distance between the first imager 1a and the second imager 1b is about 2.0 m or less. Accordingly, the first imager 1a and the second imager 1b are relatively close to each other, and thus the first imager 1a and the second imager 1b are easily installed in the relatively small marine vessel 100.

According to a preferred embodiment of the present invention, the controller 3 is configured or programmed to detect the feature point F corresponding to the object O in the images based on the images captured by the first imager 1a and the second imager 1b to create the water area map M in which the object presence range F1 including a likelihood that the object O is present is set around the feature point F. Accordingly, the object presence range F1 to be avoided by the marine vessel 100 is shown in the water area map M, and thus the object O around the hull 101 is easily known.

According to a preferred embodiment of the present invention, the overall length L10 of the hull 101 is about 20 m or less. Accordingly, in the relatively small marine vessel 100, the positional accuracy of the water area map M created based on the images captured by the first imager 1a and the second imager 1b is improved.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the installation angle of the first imager with respect to the horizontal plane and the second imager is preferably about 50 degrees or less in preferred embodiments described above, the present invention is not restricted to this. In a preferred embodiment of the present invention, the installation angle of the first imager with respect to the horizontal plane and the second imager may alternatively be greater than about 50 degrees.

While the distance between the first imager and the second imager is preferably about 2.0 m or less in preferred embodiments described above, the present invention is not restricted to this. In a preferred embodiment of the present invention, the distance between the first imager and the second imager may alternatively be greater than about 2.0 m.

While the overall length of the hull is preferably about 20 m or less in preferred embodiments described above, the present invention is not restricted to this. In a preferred embodiment of the present invention, the overall length of the hull may alternatively be greater than about 20 m.

While the marine vessel is preferably an outboard motor boat in preferred embodiments described above, the present invention is not restricted to this. In a preferred embodiment of the present invention, the marine vessel may alternatively be a marine vessel other than an outboard motor boat. For example, the marine vessel may be a marine vessel including an inboard motor, an inboard-outboard motor, or a jet propulsion device.

While the object presence range is preferably indicated by a perfect circle in the water area map in preferred embodiments described above, the present invention is not restricted to this. In a preferred embodiment of the present invention, the object presence range may alternatively be indicated by a shape different from a perfect circle, such as an ellipse.

While the imaging direction of the first imager and the second imager is preferably set to the rear side of the hull in preferred embodiments described above, the present invention is not restricted to this. In a preferred embodiment of the present invention, the imaging direction of the first imager and the second imager may alternatively be different from the rear side of the hull, such as the front side, left side, or right side of the hull.

While the first imager is preferably provided at the stern of the hull in preferred embodiments described above, the present invention is not restricted to this. In a preferred embodiment of the present invention, the first imager may alternatively be provided at a location different from the stern of the hull.

While the second imager is preferably provided on the roof of the hull in preferred embodiments described above, the present invention is not restricted to this. In a preferred embodiment of the present invention, the second imager may alternatively be provided at a location different from the roof of the hull.

While the first imager located on the rear side of the second imager, which is the imaging direction, is preferably located below the second imager in preferred embodiments described above, the present invention is not restricted to this. In a preferred embodiment of the present invention, the first imager located on the rear side of the second imager, which is the imaging direction, may alternatively be located above the second imager.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A water area object detection system comprising:
    a first imager provided on a hull to image an object around the hull;
    a second imager provided on the hull such that an imaging direction of the second imager is the same or substantially the same as an imaging direction of the first imager and operable to image the object around the hull;
    a controller configured or programmed to perform a control to create a water area map around the hull based on images captured by the first imager and the second imager; and
    a display to display the water area map; wherein
    the first imager and the second imager are configured to image a rear side of the hull;
    the second imager is spaced apart in an upward-downward direction of the hull from the first imager;
    the first imager is spaced apart in the imaging direction from the second imager so as not to overlap the second imager in the upward-downward direction perpendicular to the imaging direction;
    the second imager is spaced apart in a forward direction of the hull from the first imager such that the first imager is located below and behind the second imager in the imaging direction; and
    the display displays on the water area map a predetermined angle of view indicating an imaging area being imaged by the first imager and the second imager.

2. The water area object detection system according to claim 1, wherein the first imager and the second imager are located at a stern of the hull and on a roof of the hull, respectively.

3. The water area object detection system according to claim 1, wherein the second imager is located such that the first imager fits within an imaging range of the second imager.

4. The water area object detection system according to claim 3, wherein the first imager has an installation angle of about 50 degrees or less with respect to a horizontal plane and the second imager.

5. The water area object detection system according to claim 1, wherein the controller is configured or programmed to automatically dock the hull by automatically moving the hull toward a shore structure corresponding to the object imaged by the first imager and the second imager.

6. The water area object detection system according to claim 1, wherein the second imager is located with respect to the first imager such that a target error of a distance to the object measured using the first imager and the second imager is about 10 cm or less when the distance to the object imaged by the first imager and the second imager is about 10 m or less.

7. The water area object detection system according to claim 1, wherein the controller is configured or programmed to create the water area map as a two-dimensional water area map to be extending in a horizontal direction perpendicular to the upward-downward direction in which the first imager and the second imager are spaced apart from each other.

8. The water area object detection system according to claim 1, wherein a distance between the first imager and the second imager is about 2.0 m or less.

9. The water area object detection system according to claim 1, wherein the controller is configured or programmed to detect a feature point corresponding to the object in images based on the images captured by the first imager and the second imager to create the water area map in which an object presence range including a likelihood that the object is present is set around the feature point.

10. A water area object detection system comprising:
    a first imager provided on a hull to capture an image around the hull;
    a second imager separate from the first imager, provided on the hull such that an imaging direction of the second imager is the same or substantially the same as an imaging direction of the first imager, and operable to capture an image around the hull;
    a controller configured or programmed to perform a control to create a water area map around the hull based on the images captured by the first imager and the second imager;
    a display to display the water area map; wherein
    the first imager and the second imager are configured to image a rear side of the hull;
    the second imager is spaced apart in an upward-downward direction of the hull from the first imager;
    the first imager is spaced apart in the imaging direction from the second imager such that the first imager is located below and behind the second imager in the imaging direction; and
    the display displays on the water area map a predetermined angle of view indicating an imaging area being imaged by the first imager and the second imager.

11. A marine vessel comprising:
    a hull; and
    a water area object detection system provided on or in the hull; wherein
    the water area object detection system includes:
        a first imager provided on a hull to image an object around the hull;
        a second imager provided on the hull such that an imaging direction of the second imager is the same or substantially the same as an imaging direction of the first imager and operable to image the object around the hull;
        a controller configured or programmed to perform a control to create a water area map around the hull based on images captured by the first imager and the second imager; and
        a display to display the water area map;
    the first imager and the second imager are configured to image a rear side of the hull;
    the second imager is spaced apart in an upward-downward direction of the hull from the first imager;
    the first imager is spaced apart in the imaging direction from the second imager so as not to overlap the second imager in the upward-downward direction perpendicular to the imaging direction;

the second imager is spaced apart in an upward direction of the hull from the first imager and spaced apart in a forward direction of the hull from the first imager; and the display displays on the water area map a predetermined angle of view indicating an imaging area being imaged by the first imager and the second imager.

12. The marine vessel according to claim 11, wherein the hull has an overall length of about 20 m or less.

13. The marine vessel according to claim 11, wherein the first imager and the second imager are located at a stern of the hull and on a roof of the hull, respectively.

14. The marine vessel according to claim 11, wherein the second imager is located such that the first imager fits within an imaging range of the second imager.

15. The marine vessel according to claim 14, wherein the first imager has an installation angle of about 50 degrees or less with respect to a horizontal plane and the second imager.

16. The marine vessel according to claim 11, wherein the controller is configured or programmed to automatically dock the hull by automatically moving the hull toward a shore structure corresponding to the object imaged by the first imager and the second imager.

17. The marine vessel according to claim 11, wherein the second imager is located with respect to the first imager such that a target error of a distance to the object measured using the first imager and the second imager is about 10 cm or less when the distance to the object imaged by the first imager and the second imager is about 10 m or less.

18. The marine vessel according to claim 11, wherein the controller is configured or programmed to create the water area map as a two-dimensional water area map to be extending in a horizontal direction perpendicular to the upward-downward direction in which the first imager and the second imager are spaced apart from each other.

* * * * *